Figure 1:
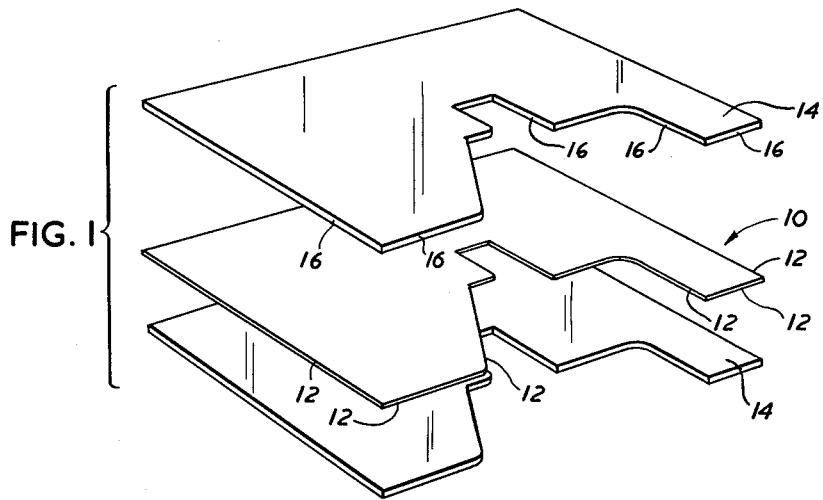

June 30, 1964   L. S. MAGOR   3,139,003
PATTERN AND METHOD OF CONSTRUCTION THEREOF
Filed March 22, 1962

*INVENTOR*
LINCOLN S. MAGOR
BY: *R. L. Westell*
PATENT AGENT

United States Patent Office 3,139,003
Patented June 30, 1964

3,139,003
PATTERN AND METHOD OF CONSTRUCTION THEREOF
Lincoln S. Magor, Galt, Ontario, Canada, assignor to Retor Developments Limited, Galt, Ontario, Canada, a corporation of Canada
Filed Mar. 22, 1962, Ser. No. 181,562
4 Claims. (Cl. 90—62)

This invention relates to templates and to a method of constructing them.

By template I mean a pattern in the form of a thin plate whose edge is designed to guide a tracing or sensing element to produce patterns or bodies of similar contour.

Prior templates have been constructed from a sheet of material which, over its general area and also along the tracing edge, has sufficient thickness to be self-sustaining during handling and use.

Such template, of substantial thickness at its tracing edge, is expensive to construct. The pattern for the template must be first laid out on the template stock material and the template then cut out. The tracing edge for the template must then be finished to smooth off any errors introduced in the cutting off operation. The operation of constructing the template may require, in addition to the layout, the operations of sawing; and for finishing the template of: milling, grinding, filing and the like, all directed to the purpose of providing a proper template edge. Moreover due to the number of operations required to finish prior templates, the accuracy thereof depends on the manual skill of the person constructing the template.

It is an object of this invention to provide a template and a method of constructing it wherein the tracing edge may be simply cut by a knife-edged cutter and sawing, milling, grinding, filing and the like are eliminated.

It is an object of this invention to provide a template and a method of constructing it which allow a template to be accurately constructed without relying on the manual skill of the operator.

It is an object of this invention to provide a template which may be constructed without a preliminary layout.

The invention comprises a template of a sheet of metal, thin enough to be easily cut, having an extent of its defining edge shaped to provide a tracing edge. Combined with the thin metal, so shaped, is at least one strip of reinforcing material bonded to the metal and shaped to support it over a major portion of its area. An edge of the reinforcing sheet is shaped roughly to conform to the shape of the tracing edge but is dimensioned to be inset therefrom so that the tracing edge projects a short distance from the reinforcing material.

In this way there is provided a template having a tracing edge of minimal thickness which may be made accurately and simply and where substantial machinery is eliminated but which has the strength of the reinforcing sheet.

The invention also comprises the method of constructing such template comprising: the step of cutting, with a knife-edged cutter, a sheet of metal stock, thin enough to be easily cut, to provide a sheet of metal having the tracing edge of the template; cutting a piece of reinforcing material such as plastic stock to have an edge conforming generally to such tracing edge but to be inset therefrom; and bonding the thin metal sheet to the reinforcing material.

Figure 2:
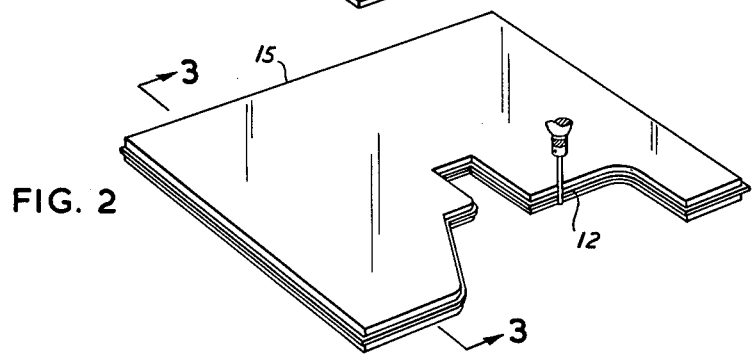
Figure 3:

In drawings which illustrate an embodiment of the invention:

FIGURE 1 shows an exploded view of the elements of the template in accord with the invention, FIGURE 2 shows a template in accord with the invention with a sensing element; and FIGURE 3 is a cross-section on an enlarged scale taken along the lines 3—3 of FIGURE 2.

In the drawings is shown a piece of thin metal 10 having an edge including a tracing edge 12. The metal is preferably about .003″ thick and is preferably of the type known as "shim stock." The metal sheet may be simply constructed by placing it on a chuck and cutting the tracing edge with a knife-edged cutter. This may be done on a machine tool directly from a pattern and without the necessity of any layout of the pattern on the shim stock. Once the pattern is cut it is merely necessary to deburr the edges and the metal sheet is ready for use in the template. The accuracy of the template tracing edge therefore will be independent of the manual skill of the man making the template. This is different from and an improvement on present templates.

A pair of reinforcing plastic sheets 14 preferably ⅛ of an inch thick are cut to the same general shape as the shim stock but so that the edges 16, which will be adjacent and conform generally to the tracing edge, are inset therefrom a short distance. This distance must be sufficient that the sensing element (designated in FIGURE 2 as 18), will contact only edge 12 and not edge 16. The inset distance must not be so long that the weight of the sheet 10 and/or the pressure exerted by the sensing element will cause deflection or sagging in the template. Thus in FIGURE 2, assuming that the tracing edge encompasses all but edge 15, it will be seen that the shim stock 10 projects therefrom on all other sides. With the reinforcing material and the metal so arranged, the reinforcing material is bonded to the metal in a "sandwich" arrangement and the template is complete, as shown in FIGURE 2. In FIGURE 2 the stylus 18 of a sensing element is shown in contact with the tracing edge 12 and it will be seen that the sensing element will not contact the plastic of the reinforcing member edge 16 and the accuracy of the template is therefore the accuracy of the metal sheet 10. On the other hand the strength with the two reinforcing sheets 14 is that of ¼ inch of plastic.

Thus a preliminary layout of the pattern on the template is eliminated and the usual finishing procedures including: sawing, milling, grinding and filing are eliminated. After the metal is cut, the tracing edge simply requires to be "deburred."

The preferred embodiment provides a reinforcing sheet on each side of the metal sheet and this is the better arrangement. The use of a single reinforcing sheet is considered to be within the scope of the invention although the strength and protection for the metal portion is not as great as with the preferred form.

With the standard template, the material forming the tracing edge is of substantial thickness, and the stylus must follow what is in effect a vertical surface of substantial depth. Thus an error in the reproduction qualities of the template will be introduced. The metal sheeting of .003″, in effect provides a knife-edge which is a much more accurate pattern for the stylus to follow.

The inset distance of the edge 16 from edge 12 must be sufficient that the sensing element (designated in FIGURE 2 as 18) will contact only edge 12 and not edge 16. The "inset" distance must not be so long that the weight of the sheet 10 and/or the pressure exerted by the sensing element will cause deflection or sagging in the template.

The stylus or sensing element in any particular machine tool will have a very defined sensitivity which is directly related to the stress required to deflect the stylus to control the machine tool. It will be obvious that the amount of projection of the metal stock must be related to the deflection stress so that the projection of the metal stock from the reinforcing material is sufficiently strong to make the metal stock self sustaining along its projecting area. With .003" shim stock the projection or "inset" distance should be about 1/32 of an inch.

The specific embodiment shows the use of the novel template with a machine tool of the type having a sensing element whose reaction against the template controls a tool operating on a workpiece. It will be realized that the novel template is equally useful wherever a flat element is required to provide a pattern for a tracing or sensing element.

I claim:

1. A template construction comprising: a thin sheet of metal defined by an edge, said metal being of a thickness, that, up to a predetermined amount of unsupported projection, said metal will resist a predetermined amount of buckling pressure applied edgewise, an extent of said edge defining a tracing edge; at least one sheet of reinforcing material bonded to said metal sheet to support it over a major portion of its area; said reinforcing sheet, when so attached, being constructed so that the defining edge thereof includes an extent generally following the contour of said edge but inset therefrom; the amount said extent is inset from said tracing edge being less than said predetermined projection amount over unsupported portions of said area.

2. A template as defined in claim 1 wherein said tracing edge is cut.

3. A method of constructing a template comprising: taking thin metal stock, constructing a sheet therefrom defined by an edge including a tracing edge; cutting said tracing edge with a knife-edged cutter, making at least one sheet of reinforcing material having an edge with an extent generally following said tracing edge but dimensioned so that when said reinforcing material sheet is located adjacent and parallel said edge-defined metal sheet, said tracing edge extends beyond said reinforcing edge extent a predetermined amount, bonding said reinforcing material sheets to said edge-defined metal sheet while said sheets are in said location.

4. A method of constructing a template comprising: taking thin metal stock, cutting a sheet therefrom with a knife-edged cutter whereby said sheet is defined by an edge, including a tracing edge; making a pair of sheets of reinforcing material having edges each with an extent generally following said tracing edge but dimensioned so that when said reinforcing material sheet is located adjacent and parallel said edge-defined metal sheet, said tracing edge extends beyond said reinforcing edge extent, bonding said reinforcing material sheets to said edge defined metal sheet while said sheets are in said location.

References Cited in the file of this patent

UNITED STATES PATENTS

| | | |
|---|---|---|
| 757,675 | Peucker | Apr. 19, 1904 |
| 2,000,528 | Linderman | May 7, 1935 |
| 3,046,822 | Von Zelewsky | July 31, 1962 |